US011985551B2

(12) United States Patent
Sharma et al.

(10) Patent No.: US 11,985,551 B2
(45) Date of Patent: May 14, 2024

(54) MOBILITY IN 5G WITH HANDOFF OR CELL RESELECTION DEPENDENT ON CHANGE OF USER-PLANE FUNCTIONALITY SERVING AREA

(71) Applicant: NEC Corporation, Tokyo (JP)

(72) Inventors: Vivek Sharma, Sutton (GB); Yuhua Chen, London (GB); Neeraj Gupta, London (GB)

(73) Assignee: NEC CORPORATION, Tokyo (JP)

( * ) Notice: Subject to any disclaimer, the term of this patent is extended or adjusted under 35 U.S.C. 154(b) by 110 days.

(21) Appl. No.: 16/324,756

(22) PCT Filed: Aug. 10, 2017

(86) PCT No.: PCT/JP2017/029060
§ 371 (c)(1),
(2) Date: Feb. 11, 2019

(87) PCT Pub. No.: WO2018/030509
PCT Pub. Date: Feb. 15, 2018

(65) Prior Publication Data
US 2019/0182723 A1    Jun. 13, 2019

(30) Foreign Application Priority Data

Aug. 12, 2016 (GB) .................................... 1613900

(51) Int. Cl.
*H04W 36/00* (2009.01)
*H04W 36/04* (2009.01)
*H04W 36/18* (2009.01)

(52) U.S. Cl.
CPC .... *H04W 36/0033* (2013.01); *H04W 36/0011* (2013.01); *H04W 36/0022* (2013.01); *H04W 36/04* (2013.01); *H04W 36/18* (2013.01)

(58) Field of Classification Search
None
See application file for complete search history.

(56) References Cited

U.S. PATENT DOCUMENTS 7,444,150 B2 * 10/2008 Rick ..................... H04W 60/04
455/432.1
9,949,174 B2 * 4/2018 Olsson ................ H04W 84/042
(Continued)

FOREIGN PATENT DOCUMENTS

CN       102695234 A      9/2012
JP       2013-518524 A    5/2013
(Continued)

OTHER PUBLICATIONS

"Solution: Mobility Options", Nokia, 3GPP Draft, S2-161625, Apr. 11-15, 2016, pp. 1-5.
(Continued)

*Primary Examiner* — Kenny S Lin
(74) *Attorney, Agent, or Firm* — Sughrue Mion, PLLC

(57) ABSTRACT

A communication system comprises a plurality of cells, each cell being associated with a respective serving area of TUPF. A base station controls a communication session of a communication device via the base station and a TUPF. Mobility of the communication device between a source cell and a target cell is performed as follows: when the communication session uses a nomadic IP address and the target cell is associated with the same TUPF serving area as the source cell but the base station is unable to determine the TUPF serving area of the target cell, the base station initiates a redirection procedure rather than a handover procedure. When performing the redirection procedure, the communication connection for the communication session via the
(Continued)

source cell is broken before the target cell has been prepared to receive communication for the communication session of the communication device.

4 Claims, 7 Drawing Sheets

(56) References Cited

U.S. PATENT DOCUMENTS

| | | | |
|---|---|---|---|
| 2010/0279684 A1* | 11/2010 | Salkintzis | H04W 48/20 455/434 |
| 2011/0207459 A1* | 8/2011 | Ramasamy | H04W 48/20 455/436 |
| 2012/0307799 A1 | 12/2012 | Taleb et al. | |
| 2013/0182563 A1* | 7/2013 | Johansson | H04W 76/19 370/228 |
| 2014/0301364 A1* | 10/2014 | Xu | H04W 36/22 370/331 |
| 2014/0314046 A1* | 10/2014 | Jung | H04W 36/165 370/331 |
| 2015/0304452 A1 | 10/2015 | Tran et al. | |
| 2015/0312832 A1* | 10/2015 | Huang | H04W 64/006 370/338 |
| 2016/0135072 A1* | 5/2016 | Wang | H04W 40/24 370/237 |
| 2016/0183156 A1* | 6/2016 | Chin | H04W 74/006 370/331 |
| 2017/0086049 A1* | 3/2017 | Vrzic | H04W 40/00 |
| 2017/0127325 A1* | 5/2017 | Vikberg | H04W 16/14 |
| 2017/0195926 A1* | 7/2017 | Iwai | H04W 36/12 |
| 2017/0303259 A1* | 10/2017 | Lee | H04W 28/16 |
| 2017/0347298 A1* | 11/2017 | Brown | H04W 36/00835 |
| 2017/0374604 A1* | 12/2017 | Stenfelt | H04W 48/04 |
| 2018/0139651 A1* | 5/2018 | Kim | H04W 76/12 |
| 2019/0150219 A1* | 5/2019 | Wang | H04W 76/30 370/329 |
| 2019/0208465 A1* | 7/2019 | Mihaly | H04W 8/08 |
| 2019/0223060 A1* | 7/2019 | Zhou | H04W 36/0022 |

FOREIGN PATENT DOCUMENTS

| | | |
|---|---|---|
| RU | 2511334 C2 | 4/2014 |
| WO | 2012/073940 A1 | 6/2012 |

OTHER PUBLICATIONS

"Solution on Handover procedure for different SSC modes", Huawei, HiSilicon, 3GPP Draft, S2-162607, May 17, 2016, pp. 1-3.

"3rd Generation Partnership Project; Technical Specification Group Services and System Aspects; Study on Architecture for Next Generation System (Release 14)", 3GPP TR 23.799 V0.7.0, Aug. 5, 2016, pp. 1-322.

'NGMN 5G White Paper' V1.0 by the Next Generation Mobile Networks (NGMN) Alliance, Feb. 17, 2015, pp. 1-125.

"Basic Socket Interface Extensions for IPV6", Network Working Group, Request for Comments (RFC) No. 3493, Feb. 2003, pp. 1-30.

"Advanced Sockets Application Program Interface (API) for IPV6", Network Working Group, Request for Comments (RFC) No. 3542, May 2003, pp. 1-77.

"draft-ietf-dmm-ondemand-mobility" (V7) published by the Internet Engineering Task Forse (IETF) Jul. 6, 2016, pp. 1-12.

International Search Report for PCT/JP2017/029060 dated Jan. 16, 2018 [PCT/ISA/210].

Written Opinion for PCT/JP2017/029060 dated Jan. 16, 2018 [PCT/ISA/237].

Great Britain Search Report for GB1613900.8 dated Jan. 6, 2017.

Communication dated Oct. 3, 2019 by Russian Federal Service on Intellectual Property Office in counterpart application No. 2019106643/07.

Ericsson, "Updates to Solution 6.1 on efficient SSC mode 2 and 3", SA WG2 Meeting #116, S2-164260, Jul. 11-15, 2016 (11 pages total).

Office Action dated Feb. 4, 2020 in Japanese Application No. 2019-507357.

Communication dated Oct. 27, 2020, from The China National Intellectual Property Administration in Application No. 201780063104.9.

* cited by examiner

[Fig. 1]
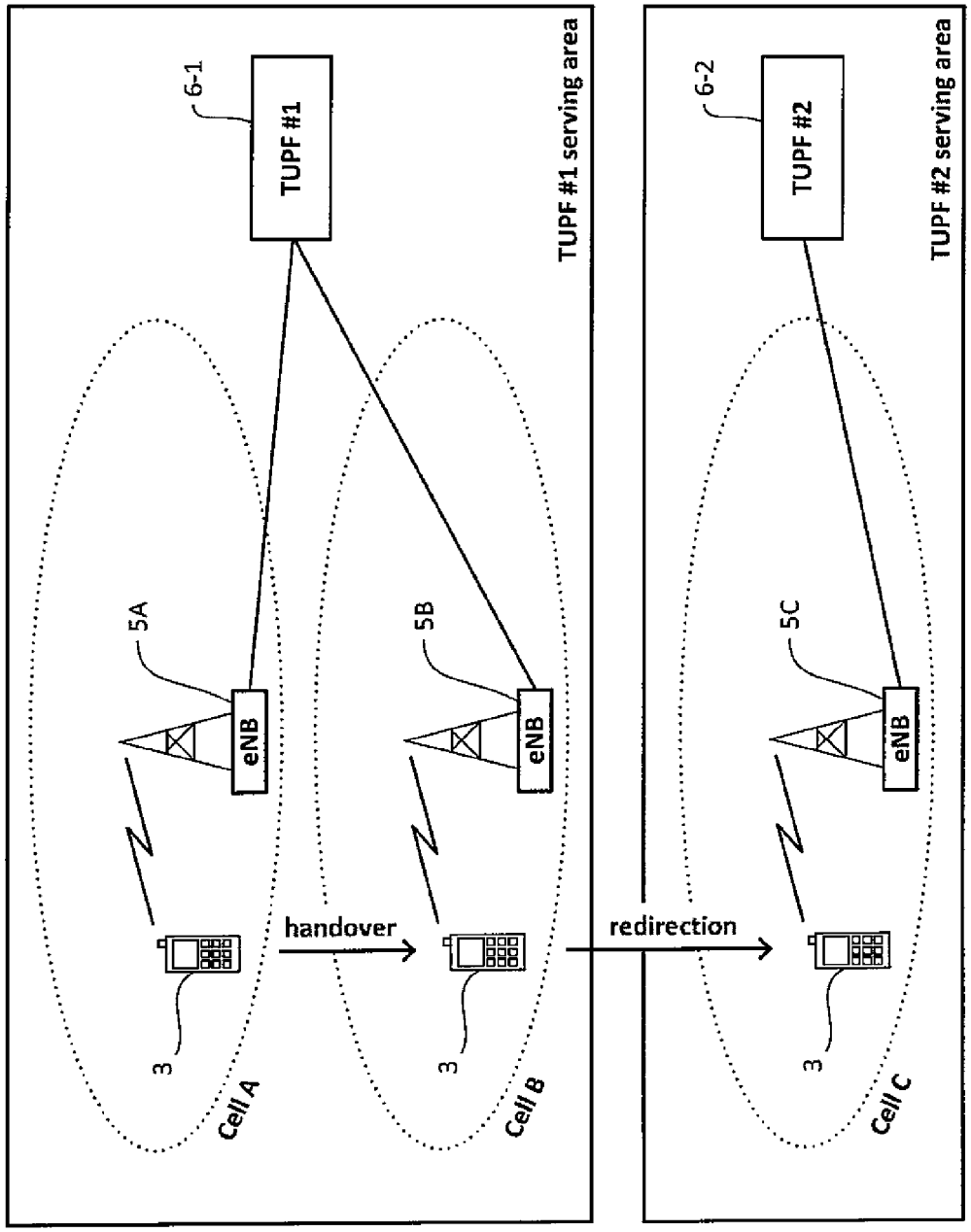

[Fig. 2]
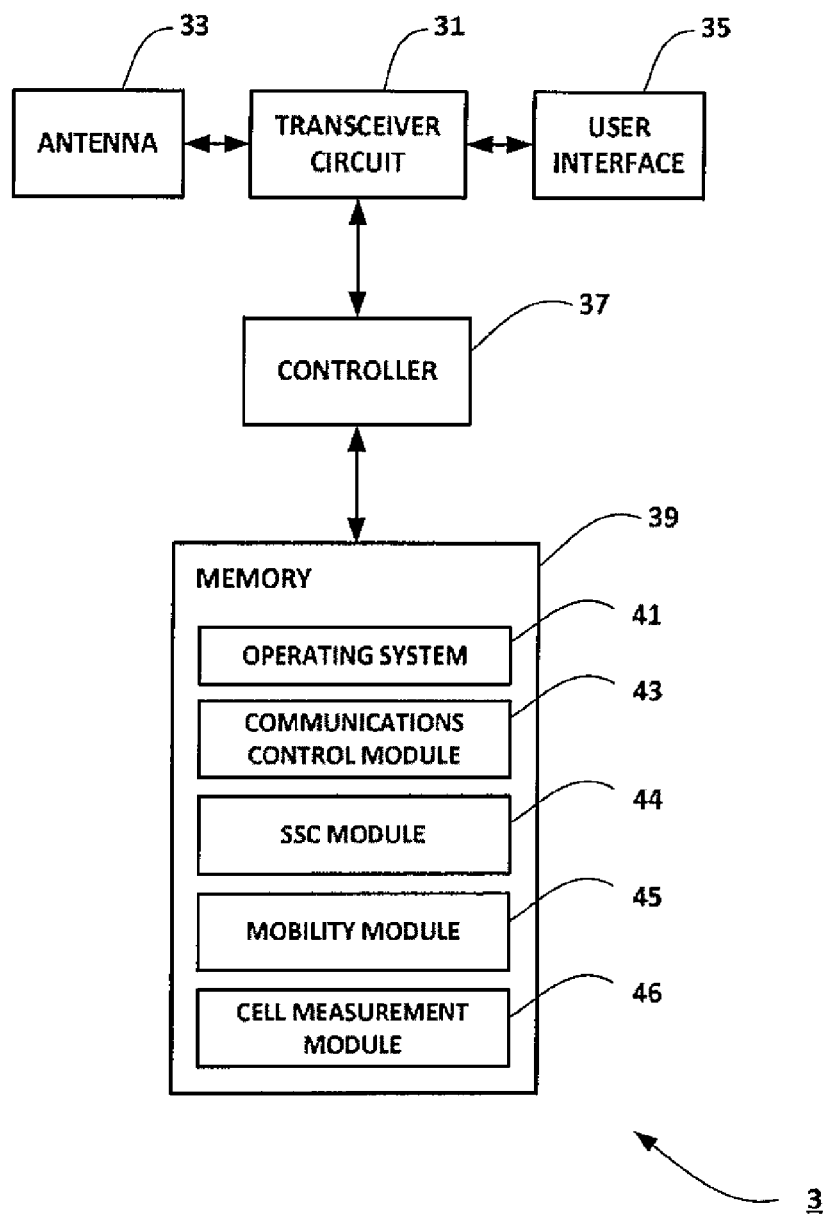

[Fig. 3]
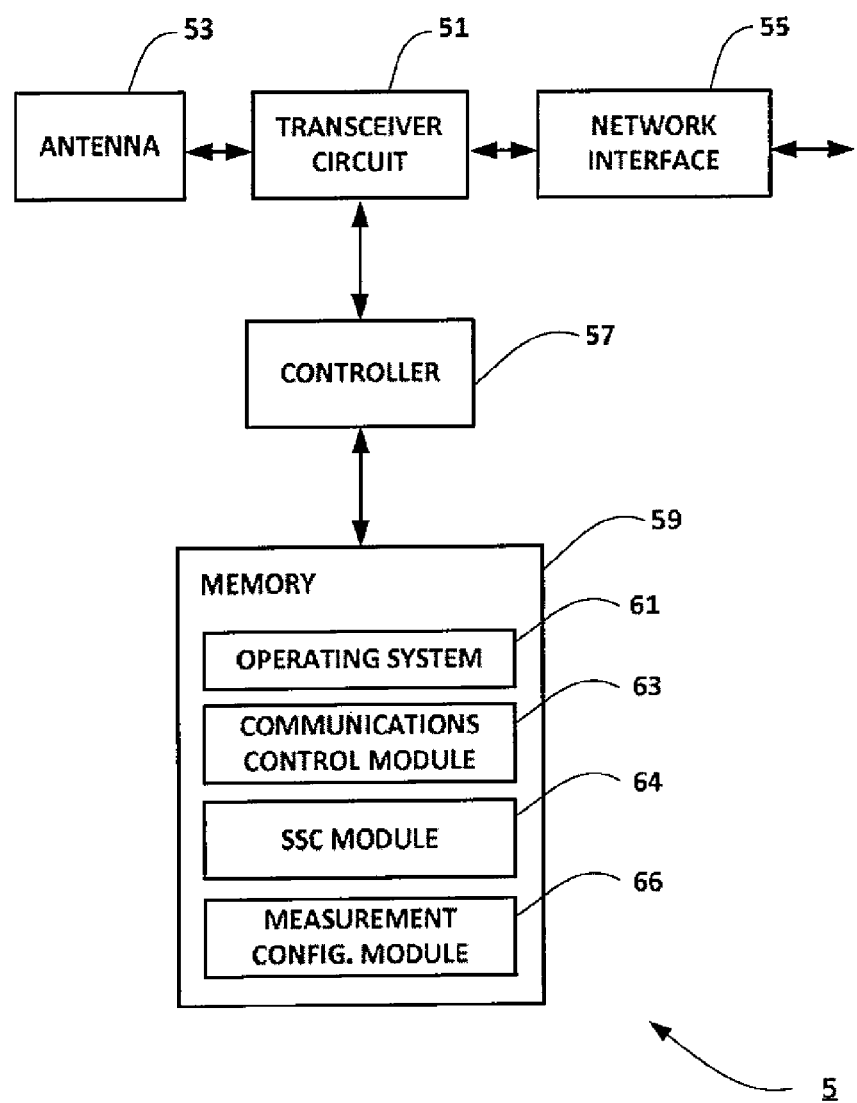

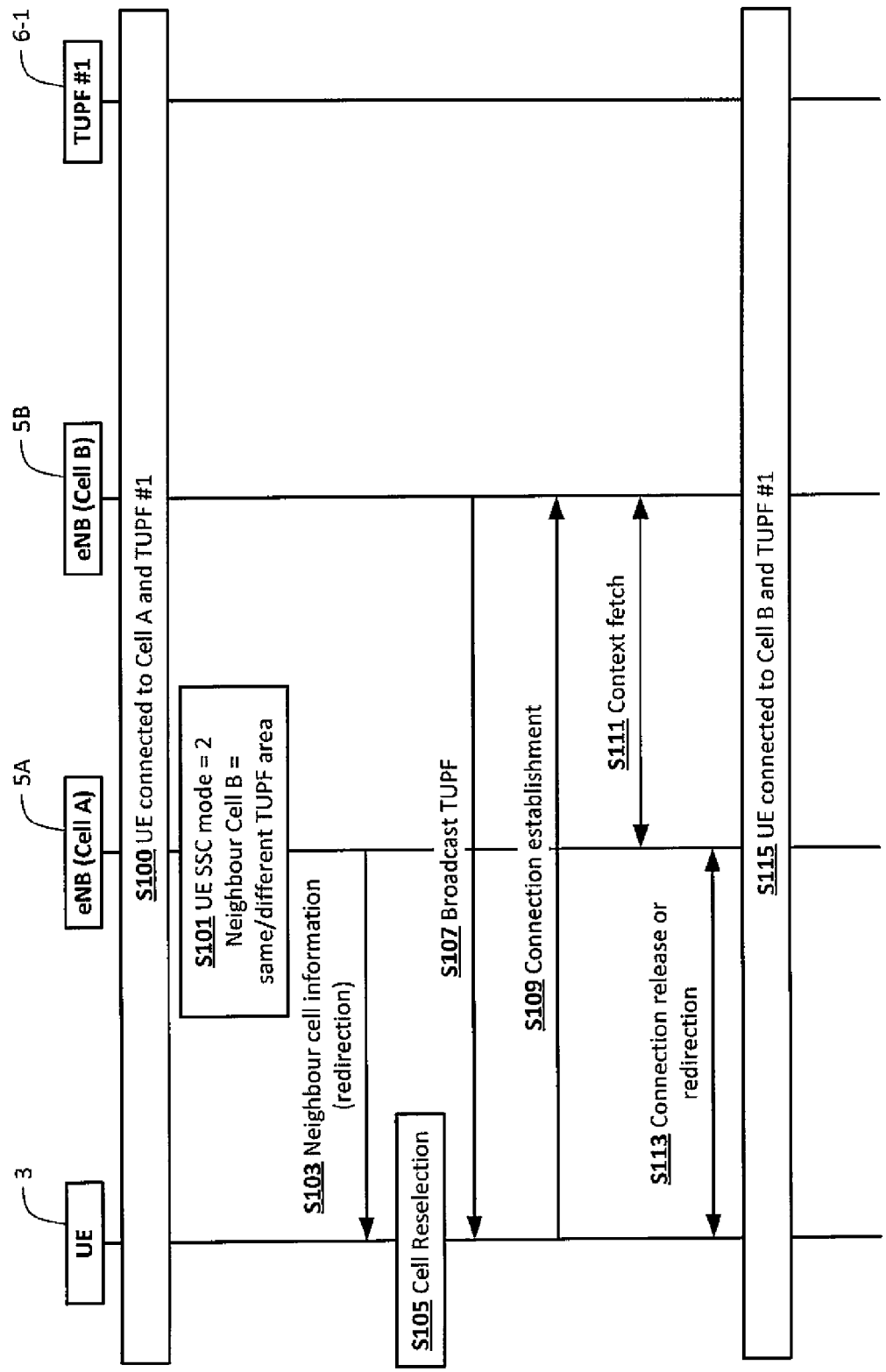

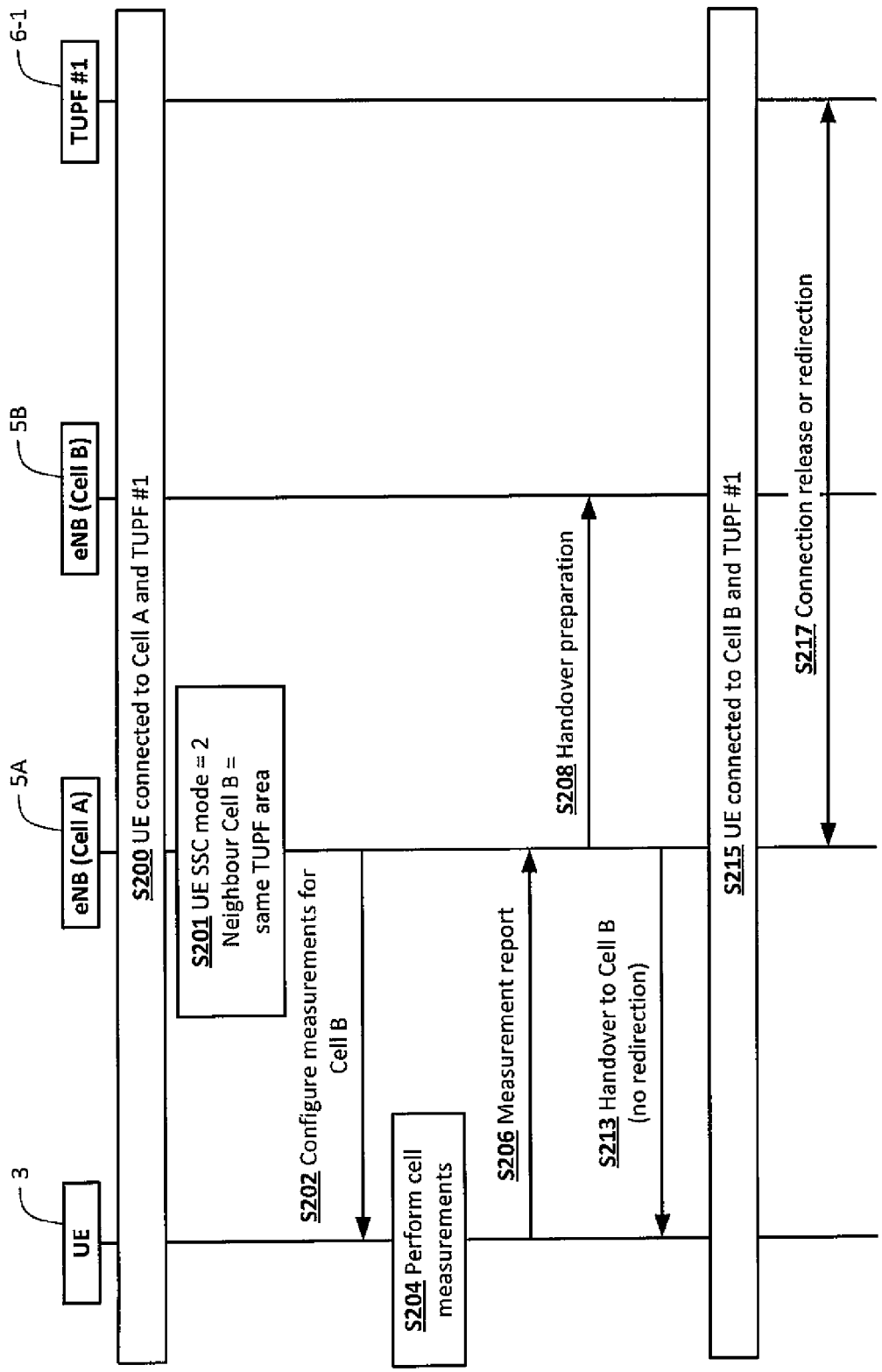

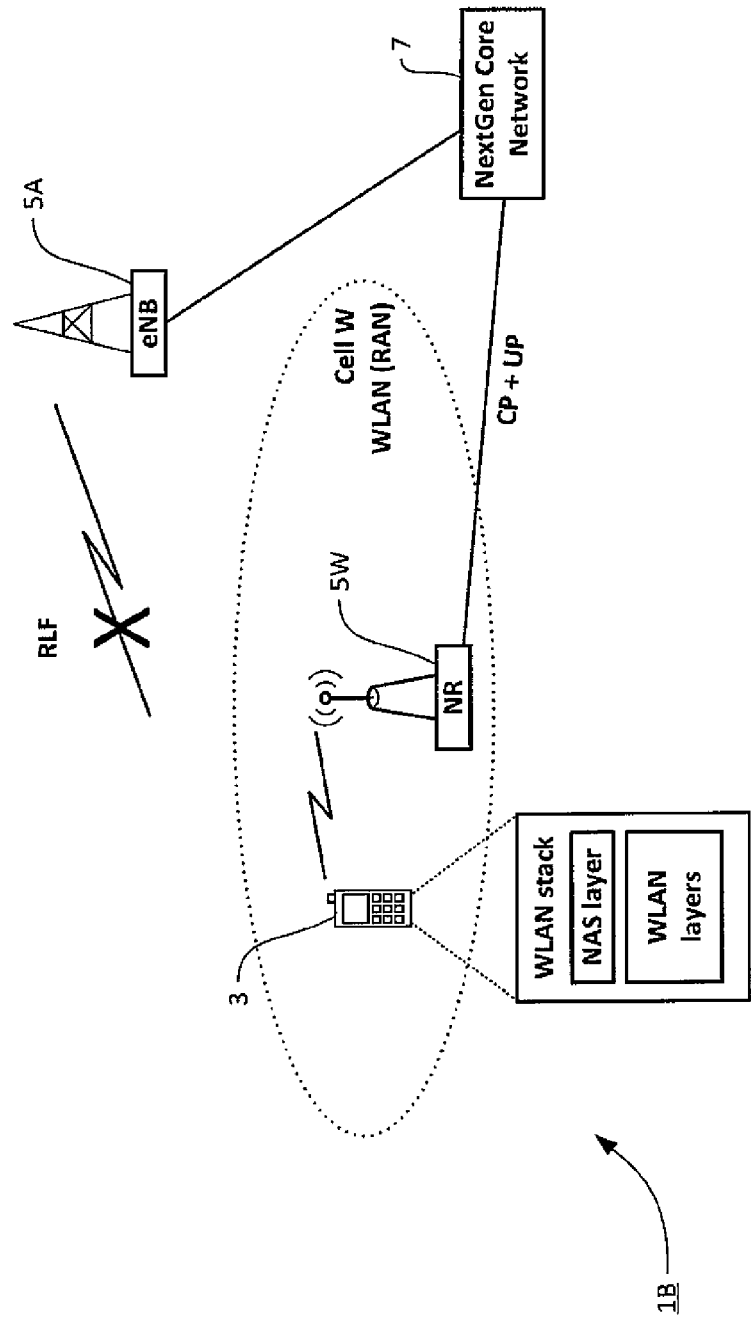
[Fig. 6]

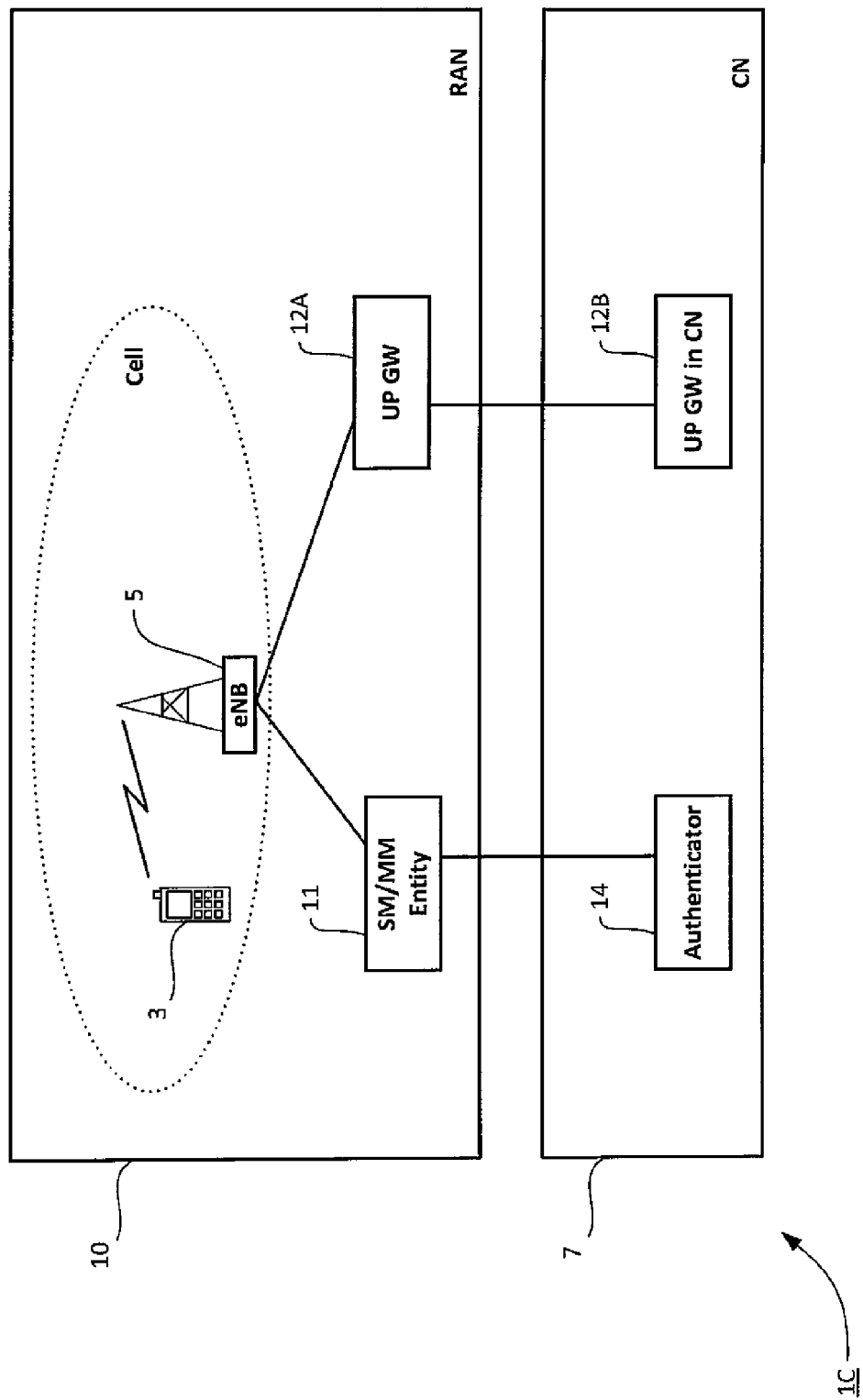
[Fig. 7]

MOBILITY IN 5G WITH HANDOFF OR CELL RESELECTION DEPENDENT ON CHANGE OF USER-PLANE FUNCTIONALITY SERVING AREA

TECHNICAL FIELD

The present invention relates to a communication system. The invention has particular but not exclusive relevance to wireless communication systems and devices thereof operating according to the 3rd Generation Partnership Project (3GPP) standards or equivalents or derivatives thereof. The invention has particular although not exclusive relevance to mobility in the so-called 'Next Generation' systems.

BACKGROUND ART

The latest developments of the 3GPP standards are referred to as the Long Term Evolution (LTE) of Evolved Packet Core (EPC) network and Evolved UMTS Terrestrial Radio Access Network (E-UTRAN), also commonly referred as '4G'. Under the 3GPP standards, a NodeB (or an eNB in LTE) is the base station via which communication devices (user equipment or 'UE' in LTE) connect to a core network and communicate to other communication devices or remote servers. For simplicity, the present application will use the term base station to refer to any such base stations and use the term mobile device or UE to refer to any such communication device. The core network (i.e. the EPC in case of LTE) hosts functionality for subscriber management, mobility management, charging, security, and call/session management (amongst others), and provides connection for communication devices to external networks, such as the Internet.

Communication devices might be, for example, mobile communication devices such as mobile telephones, smartphones, user equipment, personal digital assistants, laptop/tablet computers, web browsers, e-book readers and/or the like. Such mobile (or even generally stationary) devices are typically operated by a user, although it is also possible to connect so-called 'Internet of Things' (IoT) devices and similar machine-type communication (MTC) devices to the network. For simplicity, the present application refers to mobile devices (or UEs) in the description but it will be appreciated that the technology described can be implemented on any communication devices (mobile and/or generally stationary) that can connect to a communications network for sending/receiving data, regardless of whether such communication devices are controlled by human input or software instructions stored in memory.

The term '5G' refers to an evolving communication technology that is expected to support a variety of applications and services. Various details of 5G networks are described in, for example, the 'NGMN 5G White Paper' V1.0 by the Next Generation Mobile Networks (NGMN) Alliance, which document is available from https://www.ngmn.org/5g-white-paper.html. 3GPP intends to support 5G by way of the so-called 3GPP Next Generation (NextGen) radio access network (RAN) and the 3GPP NextGen core network.

3GPP technical report (TR) 23.799 V0.7.0 describes a possible architecture and general procedures for NextGen (5G) systems planned for Release 14 of the 3GPP standards. This technical report introduces the so-called Terminating User Plane Function (TUPF) which is effectively a logical network node coupled to one or more cells (base stations) and which terminates the 3GPP user plane and interfaces with the data network. It is assumed that an appropriate protocol data unit (PDU) session is provided between the TUPF and each connected UE (i.e. UEs served by base stations coupled to that TUPF). 3GPP TR 23.799 also describes (in section 6.6) three possibilities for providing support for session and service continuity (SSC) for UEs in NextGen systems. These possibilities are referred to as 'SSC modes', and they are defined as follows:

SSC mode 1: The same TUPF is maintained regardless of the radio access technology (RAT) and cell the UE is using to access the network.

SSC mode 2: The same TUPF is only maintained across a subset (i.e. one or more, but not all) of the access network attachment points (e.g. cells and RATs), referred to as the serving area of the TUPF. When the UE leaves the serving area of a TUPF, the UE will be served by a different TUPF suitable for the UE's new point of attachment to the network. In this case, the serving area of a particular TUPF may also be limited to a single cell only (e.g. in case of stationary UEs).

SSC mode 3: In this mode the network allows the establishment of UE connectivity via a new TUPF to the same data network (DN) before connectivity between the UE and the previous TUPF is terminated. When trigger conditions apply, the network selects a target TUPF suitable for the UE's new point of attachment to the network. While both TUPFs are active, the UE either actively rebinds applications from the previous to the new address/prefix, or alternatively, the UE waits for flows bound to the previous address/prefix to end.

SSC modes apply per PDU session. A UE may request different SSC modes for its different PDU sessions, i.e. different PDU sessions which are active in parallel for the same UE may have different SSC modes. The associated SSC mode is not changed during the lifetime of a PDU session.

A UE can determine the SSC mode required for an application when an application in the UE starts a new flow (i.e. opens a new socket). In this case the application indicates the type of session continuity required by this flow. This may be indicated using one of the sockets application programming interface (API) extensions specified in e.g. Request for Comments (RFC) no. 3493, RFC no. 3542, and in Internet-Draft "draft-ietf-dmm-ondemand-mobility" (V7) published by the Internet Engineering Task Force (IETF). In other words, the application may use an already specified software API to indicate what type of session continuity is required. The definition of IP session continuity, IP address reachability, nomadic (i.e. non-sustained), sustained (i.e. session-lasting), and fixed IP address can be found in draft-ietf-dmm-ondemand-mobility, the contents of which are incorporated herein by reference.

In summary, IP (Internet Protocol) session continuity is defined as the ability to maintain an ongoing IP session by keeping the same local end-point IP address throughout the session despite the mobile host changing its point of attachment within the IP network topology (even though the IP address of the host may change between two independent IP sessions, it does not jeopardize the IP session continuity. IP session continuity is essential for mobile hosts to maintain ongoing flows without any interruption.

IP address reachability is defined as the ability to maintain the same IP address for an extended period of time. In this case, the IP address remains the same across independent IP sessions, and even in the absence of any IP session. The IP address may be published in a long-term registry (e.g. a domain name server, DNS) and it is made available for serving incoming connections.

A nomadic (or non-persistent) IP address is a type of IP address that provides neither IP session continuity nor IP address reachability. A nomadic IP address is obtained from the serving IP gateway and it is not maintained across gateway changes. In other words, the nomadic IP address may be released and replaced by a new IP address when the IP gateway changes due to the movement of the mobile host (e.g. UE).

While certain applications (e.g. servers, virtual local area network (VLAN) clients, and secure shell (SSH) sessions) typically require a fixed IP address, applications with short-lived IP sessions (such as web browsers) can use sustained IP addresses. Applications with very short IP sessions, such as DNS clients and instant messengers, can use nomadic IP addresses. Even though they could also use a fixed or sustained IP address, nomadic IP address may be preferred because it helps minimising transmission latency.

Mobile IP is designed to provide both IP session continuity and IP address reachability to mobile hosts. However, in reality not every application may need those benefits.

For example, if an application requests a socket with a nomadic IP address, essentially, the application requests SSC mode 2 (not requiring IP session continuity nor IP address reachability). If the application requests a socket with a fixed IP address or a sustained IP address, essentially, the app requests SSC mode 1 or SSC mode 3, respectively.

If the application itself does not indicate the type of required session continuity, the UE may determine the required session continuity using network provisioned policy, e.g. a list of prioritised rules where each rule indicates the required SSC mode for specific applications or specific flow types. For example, the provisioned policy may include the following rules:

Rule 1, priority 1: App=com.example.skype
Required continuity type=SSC mode 3.
Rule 2, priority 2: App=com.example.web.server
Required continuity type=SSC mode 1.
Rule 3, priority 3: Protocol=TCP; DstPort=80
Required continuity type=SSC mode 2.
Default rule: Default continuity type=SSC mode 2.

The UE requests a PDU session with the default SSC mode when the UE cannot determine an SSC mode (for example, when the UE attempts to establish a PDU session before receiving a request from an application (e.g. during initial attach) or the application does not request an SSC mode). The default SSC mode can be either one of the three SSC modes discussed above. For example, a fixed IoT sensor or even a smartphone may be provisioned with SSC mode 2 by default.

When requesting a new PDU session, the UE may indicate the requested SSC mode as part of the PDU session setup signalling to the network (e.g. the NextGen core network, using non-access stratum (NAS) signalling). The subscription information associated with the UE (stored in the subscriber database) includes a list of supported SSC modes and a default SSC mode per data network, which is provided to the serving network. Thus, if a UE does not provide an SSC mode when requesting a new PDU session (e.g. when the UE is not provisioned with a default SSC mode), then the network can select a default SSC mode for the requested PDU session (e.g. as per subscription and/or local configuration). In any case, the serving network may select a different SSC mode than the one requested by the UE (by modifying the requested SSC mode based on subscription and/or local configuration). For example, the serving network may prefer to avoid a particular SSC mode for a particular specific data network (e.g. avoid SSC mode 1 in order to reduce the risk of concentrating traffic in a data network). It will be appreciated that the selection of an appropriate SSC mode for a PDU session is transparent to the RAN (e.g. because subscription data may not be directly available to RAN nodes) and it is performed by an appropriate core network control-plane function (e.g. a mobility management entity and/or the like).

After selecting the SSC mode, the network either (a) accepts the PDU session request from the UE (and indicates the selected SSC mode to the UE) or (b) rejects the PDU session request (and sends the selected SSC mode and a cause value to the UE) indicating that the selected SSC mode cannot be used (e.g. already used by another PDU session in the UE). If the PDU session request is accepted, the network selects a TUPF for the new PDU session. When selecting a TUPF, the network takes into account the UE's current point of attachment and the requested SSC mode (i.e. the SSC mode originally requested by the UE or the one modified by the serving network).

When the UE (having an SSC mode 2 PDU session) moves between cells within the same TUPF, normal handover procedure may be used. However, when the UE moves to a cell (base station) served by a different TUPF, the so-called redirection procedure is used. In case of SSC mode 2, this may be referred to as 'nomadic mobility'.

Redirection involves releasing the user plane path associated with the current TUPF and then setting up a user plane path corresponding to a new TUPF. The UE remains attached during the redirection procedure. In one possibility the PDU session is preserved when reallocating the TUPF and in another possibility the network disconnects the UE's PDU session corresponding to the current TUPF and then requests the UE to reactivate the PDU session immediately which triggers selection of a new TUPF.

When considering redirection of a UE's PDU session to a different TUPF from the currently assigned one, the network takes into account the UE's mobility and local policies (e.g. information about the serving area of the currently assigned TUPF). The network selects a new TUPF based on the UE's current point of attachment to the network.

Since multiple PDU sessions with multiple SSC modes can coexist for the same UE, it will be appreciated that a self-organising network (SON) type functionality is used for handling redirections. For example, if an enterprise operates two base stations and adds a new cell to one of the base stations, then mobility for nomadic UEs must not be affected by this cell addition (i.e. the addition of a cell to one base station and/or any change of an already added cell should be possible without requiring manual reconfiguration of the other base station).

SUMMARY OF INVENTION

Technical Problem

However, mapping between TUPF service areas and cells/transmission points is not yet defined by 3GPP for SSC mode 2. Moreover, each application may have a different associated TUPF and different TUPF service area. For example, a fixed sensor might have a TUPF service area of a single cell, while a smartphone or a laptop might have a TUPF service area comprising all cells of the network (e.g. in case of an enterprise deployment). It will be appreciated that such mapping may also be required for the UE, i.e. for applications requiring SSC mode 2. 3GPP also has not defined appropriate procedures for supporting redirection for SSC mode 2 PDU sessions. This may cause incompatibility issues between base stations/TUPF nodes made by different manufactures and may result in the UE losing its network attachment during TUPF relocation.

Accordingly, preferred example embodiments of the present invention aim to provide methods and apparatus which address or at least partially deal with the above issues.

Although for efficiency of understanding for those of skill in the art, the invention will be described in detail in the context of a 3GPP system (5G networks), the principles of the invention can be applied to other systems.

Solution of Problem

In one aspect, the invention provides a base station for a communication system comprising a plurality of cells, each cell being associated with a respective serving area of a user-plane function (e.g. a terminating user-plane function, TUPF) and wherein the base station comprises: a controller and a transceiver; wherein the controller is configured to control a communication session of the communication device via the base station and the user-plane function; wherein the controller is configured to control mobility of the communication device between a source cell operated by the base station and a target cell of the communication system; and wherein when the target cell is associated with the same user-plane function serving area as the source cell operated by the base station but the controller is unable to determine that the user-plane function serving area that the target cell is associated with is the same as the user-plane function serving area that the source cell is associated with, the controller is configured to initiate a redirection procedure, in which a communication connection for the communication session of the communication device via the source cell is broken before a base station operating the target cell has been prepared to receive communication for the communication session of the communication device via the target cell.

In another aspect, the invention provides a base station for a communication system comprising a plurality of cells, each cell being associated with a respective serving area of a terminating user-plane function, user-plane function, and wherein the base station comprises: a controller and a transceiver; wherein the controller is configured to control a communication session of the communication device via the base station and the user-plane function; wherein the controller is configured to control mobility of the communication device between a source cell operated by the base station and a target cell of the communication system; and wherein when the target cell is associated with the same user-plane function serving area as the source cell operated by the base station and the controller is able to determine that the user-plane function serving area that the target cell is associated with is the same as the user-plane function serving area that the source cell is associated with, the controller is configured to initiate a handover procedure in which a communication connection for the communication session of the communication device via the source cell is not broken until a base station operating the target cell has been prepared to receive communication for the communication session of the communication device via the target cell.

In one aspect, the invention provides a radio access network apparatus for a communication system, wherein the radio access network apparatus comprises: a controller configured to configure at least one radio bearer for at least one communication device requested data flow, wherein the controller is configured to configure the at least one radio bearer for the at least one communication device requested data flow to provide an enhanced data rate that is sufficient to meet both a data rate requirement of the requested data flow and a data rate requirement for providing additional network initiated data flow (e.g. push adverts/local content/locally generated packets) in addition to the requested data flow using the same radio bearer.

In another aspect, the invention provides a radio access network apparatus for a communication system, wherein the radio access network apparatus comprises: a controller configured to configure at least one radio bearer for at least one communication device requested data flow, wherein the controller is configured to, in addition to configuring the at least one radio bearer for the at least one communication device requested data flow, to configure at least one further standalone radio bearer for providing additional network initiated data flow (e.g. push adverts/local content/locally generated packets) in addition to the requested data flow.

In another aspect, the invention provides a radio communication device for a communication system comprising a wireless local area network, WLAN, access point wherein the communication device comprises: a controller and a transceiver; wherein the controller is configured to control the transceiver for both WLAN signalling via the WLAN access point and non-access stratum (NAS) signalling via the WLAN access point.

In yet another aspect, the invention provides a radio wireless local area network, WLAN, access point for a communication system, wherein the WLAN access point comprises: a controller and a transceiver; wherein the controller is configured to control the transceiver to receive, from a communication device, both WLAN signalling and non-access stratum (NAS) signalling, and to forward the non-access stratum (NAS) signalling to a core network.

Aspects of the invention extend to corresponding systems, methods, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently of (or in combination with) any other disclosed and/or illustrated features. In particular but without limitation the features of any of the claims dependent from a particular independent claim may be introduced into that independent claim in any combination or individually.

Whilst specific hardware apparatus having a specific physical structure (e.g. controllers and transceiver circuitry) have been disclosed for performing the various methods described herein, each step of the methods disclosed in the description and/or forming part of the claims, may be implemented by any suitable means for performing that step. In accordance with this each method aspect of the invention has a corresponding apparatus aspect comprising respective means for performing each step of that method aspect.

Example embodiments of the invention will now be described, by way of example, with reference to the accompanying drawings in which:

BRIEF DESCRIPTION OF DRAWINGS

FIG. 1 illustrates schematically a cellular telecommunication system to which example embodiments of the invention may be applied;

FIG. 2 is a block diagram of a mobile device forming part of the system shown in FIG. 1;

FIG. 3 is a block diagram of a base station forming part of the system shown in FIG. 1;

FIG. 4 is a timing diagram illustrating an exemplary way in which an example embodiment of the invention can be implemented in the system of FIG. 1;

FIG. 5 is a timing diagram illustrating an exemplary way in which another example embodiment of the invention can be implemented in the system of FIG. 1;

FIG. 6 illustrates schematically another cellular telecommunication system to which example embodiments of the invention may be applied; and FIG. 7 illustrates schematically yet another cellular telecommunication system to which example embodiments of the invention may be applied.

DESCRIPTION OF EMBODIMENTS

Overview

FIG. 1 schematically illustrates a telecommunications network 1 in which user equipment 3 (mobile telephones and/or other mobile devices) can communicate with each other via base stations 5 (denoted 'eNB') using an appropriate radio access technology (RAT). As those skilled in the art will appreciate, whilst one mobile device 3 and three base stations 5A, 5B, 5C are shown in FIG. 1 for illustration purposes, the system, when implemented, will typically include other base stations and mobile devices.

Each base station 5 operates one or more associated cells. In this example, the first base station 5A operates Cell A, the second base station 5B operates Cell B, and the third base station 5C operates Cell C. The first and second base stations 5A and 5B belong to a first service area and they are coupled to a terminating user-plane function (TUPF) 6-1. The third base station 5C belongs to a second service area and it is coupled to a different TUPF 6-2. It will be appreciated that each TUPF 6 may reside in an entity in an associated core network 7 or at the edge of the RAN (although not forming part of the RAN itself) to which the base stations 5 belong.

Although not shown in FIG. 1, the base stations 5 are connected to the core network 7 (e.g. via their associated TUPF 6 and one or more gateways) and neighbouring base stations are also connected to each other either directly or via an appropriate base station gateway. The core network 7 may include, amongst others, a control plane manager entity and a user plane manager entity, one or more gateways (GWs) for providing a connection between the base stations 5 and other networks (such as the Internet) and/or servers hosted outside the core network.

The mobile device 3 connects to an appropriate cell (depending on its location and possibly on other factors, e.g. signal conditions, subscription data, capability, and/or the like) by establishing a radio resource control (RRC) connection with the base station 5 operating that cell. The mobile device 3 and base stations 5 (and other transmission points in the network) communicate over an appropriate air interface which depends on the RAT used. The mobile device 3 communicate with core network nodes (e.g. TUPFs 6) using so-called non-access stratum (NAS) signalling, which is relayed between the mobile device 3 and the appropriate core network node by the base station 5 serving the mobile device 3.

In the example shown in FIG. 1, the mobile device 3 has a PDU connection with the network in SSC mode 2 (e.g. using a nomadic IP address). The mobile device 3 is initially connected to Cell A (base station 5A) which is managed by TUPF 6-1. In this example, there are two cells in the TUPF#1 serving area, i.e. Cell A and Cell B. Thus, when the mobile device 3 moves between Cell A and Cell B (within TUPF#1), normal handover procedure is used. However, when the mobile device 3 moves across to Cell C, which belongs to the TUPF#2 service area, redirection procedure is used whereby the mobile device's 3 user-plane (PDU) connection to TUPF 6-1 is released and the mobile device 3 initiates a new connection to TUPF 6-2 (via base station 5C).

Because the selection of an SSC mode and nomadic IP address allocation is transparent to the RAN (i.e. the base stations 5), the current serving base station 5 needs to know whether to initiate a handover or a redirection when the mobile device 3 is about the leave the area covered by that base station's 5 cell.

Beneficially, the base stations 5 are configured to follow one of the following options.

In one option, the base station 5 may be configured to assume that the TUPF 6 changes with each cell change (i.e. assume a single cell per TUPF service area) and trigger a redirection procedure for each cell change. In this case, the mobile device 3 is required to break its connection with its current serving base station 5 before creating a new connection with a new serving base station 5. This option effectively corresponds to the way mobility support is provided between access points of a wireless local area network (WLAN). There is no need for the base station 5 to store a mapping between cells and TUPF service areas and the SSC mode(s) used by the mobile device 3.

In another option, the base stations 5 may be configured to store a mapping between cells, TUPF service areas, and SSC modes. In this case, the base stations (e.g. base stations 5A and 5B) can allow seamless mobility within the coverage of a given TUPF 6 (e.g. between Cell A and Cell B controlled by TUPF 6-1) by performing an appropriate handover procedure. However, for inter TUPF mobility (e.g. between Cell B and Cell C which belong to different TUPF serving areas), mobility is provided via a relocation procedure, i.e. the mobile device 3 is required to break its connection with its current serving base station (e.g. base station 5B) before creating a new connection with a new serving base station (e.g. base station 5C).

Mobile Device

FIG. 2 is a block diagram illustrating the main components of the mobile device 3 shown in FIG. 1 (e.g. a mobile telephone or other user equipment). As shown, the mobile device 3 has a transceiver circuit 31 that is operable to transmit signals to and to receive signals from a base station 5 via one or more antenna 33. The mobile device 3 has a controller 37 to control the operation of the mobile device 3. The controller 37 is associated with a memory 39 and is coupled to the transceiver circuit 31. Although not necessarily required for its operation, the mobile device 3 might of course have all the usual functionality of a conventional mobile telephone 3 (such as a user interface 35) and this may be provided by any one or any combination of hardware, software and firmware, as appropriate. Software may be pre-installed in the memory 39 and/or may be downloaded via the telecommunications network or from a removable data storage device (RMD), for example.

The controller 37 is configured to control overall operation of the mobile device 3 by, in this example, program instructions or software instructions stored within the memory 39. As shown, these software instructions include, among other things, an operating system 41, a communications control module 43, an SSC module 44, a mobility module 45, and a cell measurement module 46.

The communications control module 43 is operable to control the communication between the mobile device 3 and its serving base station 5 (and other communication devices connected to the serving base station 5, such as further mobile devices and/or network nodes).

The SSC module 44 is responsible for managing session and service continuity for each PDU session that the mobile device 3 has with the network, based on a respective associated SSC mode. The SSC module 44 is configured to associate an appropriate SSC mode to each application that resides in the mobile device 3 and/or each application that requests a PDU session. The SSC mode may be associated to an application/PDU session based (predetermined) provisioned policy, information provided by the application (e.g. when requesting a new PDU session), and/or information provided by the network (e.g. when accepting the PDU session).

The mobility module 45 is responsible for maintaining network attachment via an appropriate cell (of a base station 5) whilst the mobile device 3 is moving within the area covered by the communication network 1. The mobility module 45 maintains network attachment by performing a cell reselection and/or handover procedure in dependence on signal conditions and/or the like. It will be appreciated that the mobility module 45 may perform a cell reselection and/or handover procedure even when the mobile device 3 remains stationary, for example, due to changes in signal conditions, network load in the current cell, and/or the like. The mobility module 45 communicates with the serving base station 5 and/or core network nodes in order to exchange information relating to the network attachment (PDU session) of the mobile device 3, including for example: the type of IP address used; the SSC mode used; and information identifying the TUPF/TUPF area allocated to the mobile device 3.

The cell measurement module 46 is responsible for obtaining signal quality measurements for cells in the vicinity of the mobile device 3 and to generate and provide associated cell measurement reports to the serving base station 5. The signal quality measurements and reporting is based on an appropriate measurement configuration provided by the serving base station 5.

Base Station

FIG. 3 is a block diagram illustrating the main components of a base station 5 shown in FIG. 1. As shown, the base station 5 has a transceiver circuit 51 for transmitting signals to and for receiving signals from the communication devices (such as mobile devices 3/user equipment) via one or more antenna 53, and a network interface 55 for transmitting signals to and for receiving signals from network nodes (e.g. an associated TUPF controller 6 and/or other nodes in the core network 7). The base station 5 has a controller 57 to control the operation of the base station 5. The controller 57 is associated with a memory 59. Software may be pre-installed in the memory 59 and/or may be downloaded via the telecommunications network 1 or from a removable data storage device (RMD), for example. The controller 57 is configured to control the overall operation of the base station 5 by, in this example, program instructions or software instructions stored within the memory 59. As shown, these software instructions include, among other things, an operating system 61, a communications control module 63, an SSC module 64, and measurement configuration module 66.

The communications control module 63 is operable to control the communication between the base station 5 and mobile devices 3 (user equipment) and other network entities that are connected to the base station 5. The communications control module 63 also controls the separate flows of downlink user traffic (via associated data radio bearers) and control data to be transmitted to communication devices associated with this base station 5 including, for example, control data for core network services and/or mobility of the mobile device 3.

The SSC module 64 is responsible for maintaining a mapping database identifying a relationship among TUPF service areas, cells, and SSC modes (per UE and/or PDU session). The SSC module 64 is operable to provide this information to other modules when appropriate. For example, the SSC module 64 may inform the measurement configuration module 66 whether a neighbouring cell belongs to the same or a different TUPF serving area than the cell(s) operated by this base station 5.

The measurement configuration module 66 is responsible for configuring mobile devices 3 for performing and reporting signal quality measurements for cells in the vicinity of the mobile devices 3 (e.g. cells operated by this base station 5 and/or cells operated by neighbouring base stations). The measurement configuration module 66 obtains signal quality measurements by generating and sending an measurement configuration to a particular mobile device 3 and by receiving an associated measurement report. The measurement report may be used, for example, when performing a mobility procedure involving the mobile device 3 that provided the report.

In the above description, the mobile device 3 and the base station 5 are described for ease of understanding as having a number of discrete modules (such as the communications control modules and the SSC modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

A more detailed description will now be given (with reference to FIGS. 4 and 5) of the scenario discussed above where a mobile device is changing cells whilst operating at least one PDU session in SSC mode 2.

Operation—First Example

FIG. 4 is a timing diagram (message sequence chart) illustrating an example process performed by components of the system 1 when performing a mobility procedure between Cell A and Cell B.

Initially, as generally shown in step S100, the mobile device 3 (using its mobility module 45) connects to Cell A (operated by base station 5A) which belongs to the serving area managed by the TUPF 6-1. As part of this step, the mobile device 3 (using its communications control module 43) initiates an appropriate PDU session towards the core network 7 (via the TUPF 6-1). In this example, the PDU session uses a nomadic IP address and SSC mode 2. When setting up the PDU session, the mobile device 3 (using its mobility module 45) obtains information identifying the TUPF 6-1 (and/or the TUPF service area) handling this PDU session, for example, from NAS signalling received from the core network 7 (or from the application that set up the PDU session). The mobile device 3 (using its mobility module 45) also informs its serving base station 5A about the type of IP address and SSC mode used for this PDU session (in this example, a nomadic IP address and SSC mode 2) and the TUPF/TUPF service area identifier.

Therefore, as generally shown in step S101, the serving base station 5A (using its SSC module 64) stores information identifying that the mobile device 3 is using SSC mode 2 and information identifying the TUPF 6-1 (TUPF area) for the PDU session. However, in this case, the serving base station 5A may not have any information on whether the neighbour cell (e.g. Cell B) belongs to the same TUPF serving area as the current cell (Cell A) of the mobile device 3. Alternatively, the serving base station 5A may store information identifying whether the neighbour cell (e.g. Cell B) belongs to the same or a different TUPF serving area as the current cell (Cell A) of the mobile device 3.

Effectively, in this example, the base station 5 is configured to treat the serving area of TUPF 6-1 as a single cell TUPF area (i.e. including the current Cell A only). Therefore, regardless whether or not the neighbour cell (in this example, Cell B) belongs to the same or a different TUPF serving area as the current cell (Cell A), the base station 5 is configured to initiate a redirection for the mobile device 3 when the mobile device 3 is moving to that neighbour cell.

In this example, when the mobile device 3 is leaving the area served by Cell A, the base station 5 generates (using its communications control module 63) and sends, in step S103, an appropriate signalling message to the mobile device 3, including information about the neighbour cell (in this example, Cell B), which is the target serving cell for the mobile device 3. The information about the neighbour cell includes, for example, assistance information such as information identifying the target cell (e.g. a cell ID associated with Cell B), system information, and/or the like. Although not shown in FIG. 4 for simplicity, it will be appreciated that the base station 5 (using its measurement configuration module 66) may configure the mobile device 3 to carry out appropriate signal quality measurements and associated reporting (using its cell measurement module 46) before selecting a target cell. In this case, base station 5 may be configured to select the target cell based on the results of the cell measurements.

In step S105, the mobile device 3 performs cell reselection and, based on information broadcast (in step S107) by the new base station 5B (via Cell B), the mobile device 3 determines that the same TUPF 6-1 (and/or same TUPF service area) will continue handling the PDU session in the new Cell B (even though the mobile device 3 performs a redirection). It will be appreciated that the information broadcast by the new base station 5B may include the same information as the assistance information provided by the old base station in step S103. Accordingly, step S103 may be optional. The purpose of this information is to assist the mobile device 3 to camp on the new cell after cell reselection.

In step S109, the mobile device 3 generates and sends an appropriately formatted signalling message (e.g. an RRC message) for establishing a connection with the new serving base station 5B (operating Cell B). In step S111, the new serving base station 5B fetches, from the old serving base station 5A, the information (e.g. UE context) associated with the mobile device 3, and in step S113 the old base station 5A releases the mobile device's 3 connection via Cell A. It will be appreciated that connection release (step S113) may take place at a later (or earlier) phase.

Using the information fetched from the old base station 5A, the new base station 5B is able to continue serving the mobile device's 3 PDU session via its own cell (Cell B) and the mobile device 3 remains attached to the core network (i.e. it does not need to register again with the core network and establish a new PDU session).

It will be appreciated that the information stored by the base station 5A (for Cell A) in S101 may be stored for later use (e.g. as described below with reference to FIG. 5). Effectively, the base station 5A may be configured to learn which neighbour cell belongs to which TUPF serving area and apply this knowledge when deciding whether to trigger handover (within the same TUPF area) or redirection (to a different TUPF area) during mobility of mobile devices 3 served by this base station 5A.

Operation—Second Example

FIG. 5 is a timing diagram (message sequence chart) illustrating an example process performed by components of the system 1 when performing a mobility procedure between Cell A and Cell B. In this example, the serving base station 5A has information that the target cell (Cell B) belongs to the same TUPF serving area as the current cell (Cell A) of the mobile device 3. The base station 5A is aware of the mapping between the TUPF service area (similarly to tracking areas in LTE), SSC mode, and associated cell(s).

If a TUPF service area involves multiple cells (e.g. TUPF #1 serving area in FIG. 1), then handover is permitted within the TUPF service area. However, when the TUPF service area changes (due to mobility of the mobile device 3 between cells belonging to different TUPF areas), redirection is performed (for example, as described above with reference to FIG. 4).

Initially, as generally shown in step S200, the mobile device 3 (using its mobility module 45) connects to Cell A (operated by base station 5A) which belongs to the serving area managed by the TUPF 6-1. Step S200 corresponds to step S100 of FIG. 4. In summary, the mobile device 3 initiates an appropriate PDU session towards the core network 7 (via the TUPF 6-1) using a nomadic IP address and SSC mode 2 (in this example). The mobile device 3 obtains information identifying the TUPF 6-1 (and/or the TUPF service area) handling this PDU session and informs its serving base station 5A about the type of IP address and SSC mode used for this PDU session and the TUPF/TUPF service area identifier.

Therefore, as generally shown in step S201, the serving base station 5A (using its SSC module 64) stores information identifying that the mobile device 3 is using SSC mode 2 and information identifying the TUPF 6-1 (TUPF area) for the PDU session. In this case, the serving base station 5A also stores information identifying that the neighbour cell (e.g. Cell B) belongs to the same TUPF serving area as the current cell (Cell A) of the mobile device 3. Accordingly, with respect to Cell B, the base station 5A is configured to perform handover instead of redirection.

Specifically, as generally shown in step S202, the base station 5A (using its measurement configuration module 66) configures the mobile device 3 to carry out appropriate signal quality measurements and associated reporting with respect to a set of neighbour cells (including Cell B). In step S204, the mobile device 3 (using its cell measurement module 46) performs the configured signal quality measurements (for Cell B) and generates an appropriate measurement report. The mobile device 3 sends, in step S206, the generated measurement report (including measurement results for Cell B) to the base station 5A. In this example, the mobile device 3 also informs the serving base station 5A (e.g. in the message including the measurement report or in a similar message) if a particular cell is part of the same TUPF service area as the current cell (Cell A). For example, each base station 5 may be configured to broadcast (or inform via dedicated signalling) to the mobile device 3 the TUPF service area(s) associated with its cell (s) and the mobile device 3 may be configured to determine if the current TUPF service area matches any of the TUPF service areas associated with neighbour cells (at least those cells for which the mobile device 3 is configured to perform measurements).

Accordingly, the base station 5A is able to select an appropriate target cell for the mobile device 3 based on the results of the cell measurements and the information on whether a particular cell belongs to the same TUPF area as the current serving cell. In this example, the base station 5A selects Cell B (operated by base station 5B) as a handover target cell for the mobile device 3 (e.g. because Cell B is the best cell that meets the conditions for handover and it is within the same TUPF serving area as the current serving cell, Cell A). Therefore, the base station 5A (using its communications control module 63) generates and sends, in step S208, an appropriate signalling message to the base station 5B operating Cell B for handover preparation for the mobile device 3.

In step S213, the base station 5A (using its communications control module 63) generates and sends a signalling message instructing the mobile device 3 to initiate handover to Cell B. Therefore, after appropriate connection establishment with the new base station 5B, the mobile device 3 becomes connected to Cell B (step S215) and continues with its PDU session via the new base station 5B (in the same TUPF serving area).

As generally shown in step S217, the old serving base station 5A can now proceed to perform an appropriate connection release or redirection procedure with the TUPF 6-1 as the base station 5A is no longer serving the mobile device 3.

Modifications and Alternatives

Detailed example embodiments have been described above. As those skilled in the art will appreciate, a number of modifications and alternatives can be made to the above example embodiments whilst still benefiting from the inventions embodied therein. By way of illustration only a number of these alternatives and modifications will now be described.

In the above description, the TUPF entity is described as a stand-alone network node. However, it will be appreciated that the TUPF entity may be similar to the serving gateway (S-GW) in LTE although the TUPF may also have packet data network (PDN) gateway (P-GW) functionality. Accordingly, the TUPF may form part of an S-GW and/or a P-GW. It will also be appreciated that a user-plane function other than a TUPF, but having similar functionality, may be used in place of the TUPF described herein.

In the above description of steps S200 and S201, the mobile device informs the serving base station about the type of IP address and SSC mode used for the requested PDU session and an identifier of the TUPF/TUPF service area selected for this session. Alternatively, the base station may be configured to obtain such information from the core network (e.g. information identifying a mapping between TUPF service area and cells per SSC mode).

In the above examples, the first and second base stations (Cells A and B) belong to a first TUPF service area and the third base station (Cell C) belongs to a second TUPF service area. It will be appreciated that the service are may be applicable for a particular UE (and/or a particular application) and different UEs (and/or different applications within the same UE) may have different associated TUPF serving areas. For example, a particular application/UE may have a single TUPF service area throughout the entire network (e.g. Cells A, B, and C in FIG. 1), whilst a different application/UE may have a different definition of TUPF service areas (e.g. Cell A in one TUPF area, and Cells B and C in a different TUPF area).

It will be appreciated that the base stations may be configured to store and apply in their mobility decisions information identifying which cells can be used for handover and which cells can be used for redirection. This information may be stored per UE (subscription) and per service (optionally, per application). This information may beneficially allow flexible deployment of various applications with different needs (even though with the same SSC mode). For example, enterprise applications may be treated differently to personal applications within the same cell (and for the same mobile device).

<Standalone WLAN>

It will be appreciated that the radio access network may comprise a WLAN, for example, the WLAN shown in FIG. 6. The WLAN may have one or more cells (operated by one or more associated access points). The WLAN/access points may be connected to the 3GPP NextGen core network via an appropriate interface for communicating control plane and user-plane data between the NextGen core network and the WLAN (which acts as the NextGen RAN in this case). Each cell of the WLAN (e.g. 'Cell W' operated by access point 5W) may be treated as an individual TUPF area. Therefore, mobility for mobile devices between cells of the WLAN may be realised using the redirection procedure. Alternatively, some (or all) cells of the WLAN may be assigned to the same TUPF area. It will be appreciated that in this case the procedure described with reference to FIG. 4 may apply (i.e. trigger redirection between cells that belong to the same TUPF area).

In order for the mobile device to be able to implement 3GPP NexGen procedures in the WLAN, a NAS layer may be provided on top of the WLAN layer/WLAN stack (e.g. in the WLAN chipset of the UE). Therefore, the WLAN chipset of the mobile device may be configured to communicate with the NextGen core network using appropriate NAS signalling.

The NAS layer is responsible for mobility management (MM), session management (SM), and connection management (CM) for the mobile device, including session and service continuity (in the WLAN/RAN).

NAS layer security procedures may be used to authorise and authenticate any access RAT. On the network side security anchor and SM/MM entities may be different but from the mobile device point of view, a single NAS layer will be sufficient. WLAN security may be derived from 3GPP parameters, e.g. by providing an appropriate 'Kwt' key to the serving WLAN access point for authenticating the mobile device (e.g. when the mobile device first attaches to the WLAN). It will be appreciated that such Kwt key may be similar to (or the same as) the 'SKwt' key currently used in LTE-WLAN aggregation (LWA) for WLAN security.

It will be appreciated that the mobile device may beneficially use its WLAN connection (e.g. when it is simultaneously connected to the WLAN and a NexGen RAN) to indicate, to the core network, the occurrence of a radio link failure (RLF) on the RAN (or vice versa). This would allow better service continuity for the mobile device.

<SM/MM Entity at Edge of (NextGen) RAN>

FIG. 7 shows an exemplary control-plane (CP) and user-plane (UP) architecture. As shown, in this case an appropriate UP entity is provided at the edge of the RAN (denoted UP GA 12A). It will be appreciated that the UP entity may be used by the network operator for delivering push advertisements and/or other similar small data transmissions to mobile devices within the RAN (for example, re-using an existing RAN bearer for this purpose). Alternatively, such small data may be pushed from any other RAN entity (e.g. a router or aggregator or switch or the base station itself).

It will be appreciated that content may be pushed from the base station or an edge node without the need to create a separate IP flow (for that content). WLAN has the possibility for push advertisements and web browsers display local contents (mainly advertisements). Therefore, the 5G RAN may be adapted to provide the same possibility. One option is to over provision the radio bearers (i.e. leave room for transmission of such push advertisements/small data on top of the data for which the radio bearer is set up). For example, if IP flow #1 is 5 MBPS (for a particular mobile device) and a corresponding radio bearer is configured with 5.5 MBPS (by the base station), then 0.5 MBPS can be used for transmitting local (push) content to that mobile device (over that radio bearer).

In this case, beneficially the (push) content may be encrypted using the same security algorithm as normal data for this radio bearer (since the content is pushed on top of the PDCP layer in the base station). On the receiver side, an appropriate mechanism may be provided to separate the packets received over such an over provisioned radio bearer. On the transmitting (base station) side, packets marked for the corresponding IP flow may be detected and (additional) local content may be pushed with the same destination address, using the over-provisioned portion of the radio bearer.

It will be appreciated that a web browser (running on the mobile device) is able to publish/display the original content (requested by the mobile device itself) and any locally pushed content (e.g. push advertisements from the base station) so that no segregation of packets is needed in the UE access stratum (AS) or non-access stratum (NAS) layer.

It will also be appreciated that an appropriate standalone radio bearer configuration (corresponding to no IP flow on the CN side) may be used instead of overprovisioning for locally generated packets. Beneficially, packets may be sent to the mobile devices without SM/MM entity involvement when using such a standalone radio bearer. It will be appreciated that this solution may be implemented in a router or a TNL aggregator node or any other node (e.g. a node which is not terminating any 3GPP protocols) sitting above the eNB in the network.

In the above example embodiments, the base station uses a 3GPP radio communications (radio access) technology to communicate with the mobile device. However, any other radio communications technology (i.e. WLAN, Wi-Fi, WiMAX, Bluetooth, etc.) can be used between the base station and the mobile device in accordance with the above embodiments. The above example embodiments are also applicable to 'non-mobile' or generally stationary user equipment.

In the above description, the mobile device and the base station are described for ease of understanding as having a number of discrete functional components or modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

In the above example embodiments, a number of software modules were described. As those skilled in the art will appreciate, the software modules may be provided in compiled or un-compiled form and may be supplied to the base station, to the mobility management entity, or to the mobile device as a signal over a computer network, or on a recording medium. Further, the functionality performed by part or all of this software may be performed using one or more dedicated hardware circuits. However, the use of software modules is preferred as it facilitates the updating of the base station or the mobile device in order to update their functionalities.

The target cell may be associated with the same user-plane function serving area as the source cell operated by the base station and the controller of the base station may be able to determine that the user-plane function serving area that the target cell is associated with is the same as the user-plane function serving area that the source cell is associated with. In this case, the controller of the base station may be operable to initiate a handover procedure in which a communication connection for the communication session of the communication device via the source cell is not broken until a base station operating the target cell has been prepared to receive communication for the communication session of the communication device via the target cell.

The controller of the base station may be operable to determine a session and service continuity (SSC) mode associated with the communication session for the communication device (for example, by determining whether the communication session requires an Internet Protocol, IP, session continuity and IP address reachability in the communication system over a predetermined user-plane function service area). For example, the controller may be operable to determine the SSC mode associated with the communication session for the communication device during establishment of the communication session.

The target cell may be associated with the same user-plane function serving area as the source cell operated by the base station, in which case the controller of the base station may be operable to initiate the redirection procedure when the controller determines that the SSC mode is a mode (e.g. SSC mode 2) in which the communication session uses a nomadic (or non-persistent) IP address (e.g. when the communication session does not require either IP session continuity or IP address reachability).

The controller of the base station may be operable to initiate a mobility procedure other than a redirection procedure when the controller determines that the SSC mode is a mode (e.g. SSC mode 1) in which the communication session uses a fixed (or persistent) IP address.

The controller of the base station may be operable to maintain information identifying a mapping between SSC modes and user-plane function service areas and cells, and control mobility of the communication device based on the mapping.

The target cell may be associated with the same user-plane function serving area as the source cell operated by the base station but the controller of the base station may be unable to determine that the user-plane function serving area that the target cell is associated with is the same as the user-plane function serving area that the source cell is associated with. In this case the controller of the base station may be operable to initiate a redirection procedure, in which a communication connection for the communication session of the communication device via the source cell is broken before a base station operating the target cell has been prepared to receive communication for the communication session of the communication device via the target cell.

The base station may comprise a base station of a 3GPP next generation (NextGen/5G) radio access network.

The controller of the radio access network apparatus may be operable to encrypt both communication device requested data flow and the additional network initiated data flow using the same communication device specific security parameters.

The communication device may further comprise: a transceiver for communicating, with a base station coupled to the core network, over an associated radio bearer; and a controller operable to detect a radio link failure, RLF, relating to the radio bearer; and the controller may be operable to provide, via the WLAN access point, an indication of the RLF to a node of the core network.

Various other modifications will be apparent to those skilled in the art and will not be described in further detail here.

This application is based upon and claims the benefit of priority from United Kingdom patent application No. 1613900.8, filed on Aug. 12, 2016, the disclosure of which is incorporated herein in its entirety by reference.

The invention claimed is:

1. A base station comprising:
at least one memory storing instructions; and
at least one processor configured to process the instructions to:
control a communication session of a user equipment (UE) via the base station and a user plane function;
receive, from a core network node, UE subscription information indicating which service area can serve the UE;
determine a mobility action type from at least handover or redirection, to select a target node to which the communication session is to be transferred, using the UE subscription information in a case where the target node is in accordance with $3^{rd}$ generation partnership project (3GPP) access; and
not apply the mobility action type in a case where the target node is in accordance with non-3GPP access.

2. The base station according to claim 1, wherein the at least one processor is configured to process the instructions to transmit UE related information corresponding to the UE subscription during a procedure for transferring the communication sessionl.

3. A method performed by a base station, the method comprising:
controlling a communication session of a user equipment (UE) via the base station and the user-plane function;
receiving, from a core network node, UE subscription information indicating which service area can serve the UE;
determining a mobility action type from at least handover or redirection, to select a target node to which the communication session is to be transferred, using the UE subscription information in a case where the target node is in accordance with $3^{rd}$ generation partnership project (3GPP) access; and
not applying the mobility action type in a case where the target node is in accordance with non-3GPP access.

4. The method according to claim 3, the method further comprising:
transmitting UE related information corresponding to the UE subscription during a procedure for transferring the communication session.

* * * * *